United States Patent
Acheson et al.

(10) Patent No.: US 11,657,088 B1
(45) Date of Patent: May 23, 2023

(54) ACCESSIBLE INDEX OBJECTS FOR GRAPH DATA STRUCTURES

(71) Applicant: Amazon Technologies, Inc., Seattle, WA (US)

(72) Inventors: Alazel Acheson, Redmond, WA (US); Mahendra Manshi Chheda, Sammamish, WA (US); Hyun Sik Kim, Seattle, WA (US); Srikanth Mandadi, Redmond, WA (US)

(73) Assignee: Amazon Technologies, Inc., Seattle, WA (US)

( * ) Notice: Subject to any disclaimer, the term of this patent is extended or adjusted under 35 U.S.C. 154(b) by 500 days.

(21) Appl. No.: 15/807,364

(22) Filed: Nov. 8, 2017

(51) Int. Cl.
*G06F 16/00* (2019.01)
*G06F 16/901* (2019.01)
*G06F 16/23* (2019.01)
*G06F 16/903* (2019.01)

(52) U.S. Cl.
CPC ...... *G06F 16/9024* (2019.01); *G06F 16/2379* (2019.01); *G06F 16/90335* (2019.01)

(58) Field of Classification Search
CPC .............................. G06F 16/2246; G06F 16/24
See application file for complete search history.

(56) References Cited

U.S. PATENT DOCUMENTS

| | | | |
|---|---|---|---|
| 6,381,605 B1* | 4/2002 | Kothuri | G06F 16/2264 |
| 7,974,978 B2 | 7/2011 | Yan et al. | |
| 8,069,188 B2 | 11/2011 | Larson et al. | |
| 8,185,558 B1 | 5/2012 | Narayanan et al. | |
| 10,230,639 B1* | 3/2019 | Patil | H04L 45/48 |
| 2002/0112226 A1* | 8/2002 | Brodersen | G11B 27/34 |
| | | | 717/140 |
| 2004/0098725 A1* | 5/2004 | Ramesh | G06F 1/28 |
| | | | 719/310 |
| 2008/0059417 A1* | 3/2008 | Yamada | G06F 16/81 |
| 2008/0243770 A1 | 10/2008 | Aasman | |
| 2010/0174692 A1 | 7/2010 | Meyer et al. | |
| 2011/0296300 A1* | 12/2011 | Parker | G06Q 10/101 |
| | | | 715/256 |
| 2013/0151453 A1* | 6/2013 | Bhanot | G06N 7/005 |
| | | | 706/46 |
| 2016/0019228 A1* | 1/2016 | Hong | G06F 16/9024 |
| | | | 707/624 |

\* cited by examiner

*Primary Examiner* — Thu Nguyet T Le
(74) *Attorney, Agent, or Firm* — S. Scott Foster; Kowert, Hood, Munyon, Rankin & Goetzel, P.C.

(57) ABSTRACT

Users of a graph data store can access an index object for a graph structure in order to obtain information from objects in the graph data structured index by the index object. A query can be received that is directed to an index object. Links to a subset of data objects in the data store included in the index object can be used to access the subset of data objects to perform the query. In some embodiments, data objects can be manually added or removed from the links included in the index object.

19 Claims, 10 Drawing Sheets

US 11,657,088 B1

ACCESSIBLE INDEX OBJECTS FOR GRAPH DATA STRUCTURES

BACKGROUND

Storage systems may offer users a way to persist graph data structures that store both data objects and the relationships between the data objects. Graph data structures stored in such storage systems may provide users with the ability to store and manage related data in way that reflects the relationships between the data. Such graph data structures may be used to implement many different services, including resource management systems, directory systems, payroll systems, and other systems that leverage data relationships to reason over the data stored therein. Techniques that optimize interactions with storage systems that store graph data structures, increasing access performance and providing greater management flexibility may be highly desirable, such as techniques that increase the speed at which queries to a graph data structure can be performed.

Figure 1:
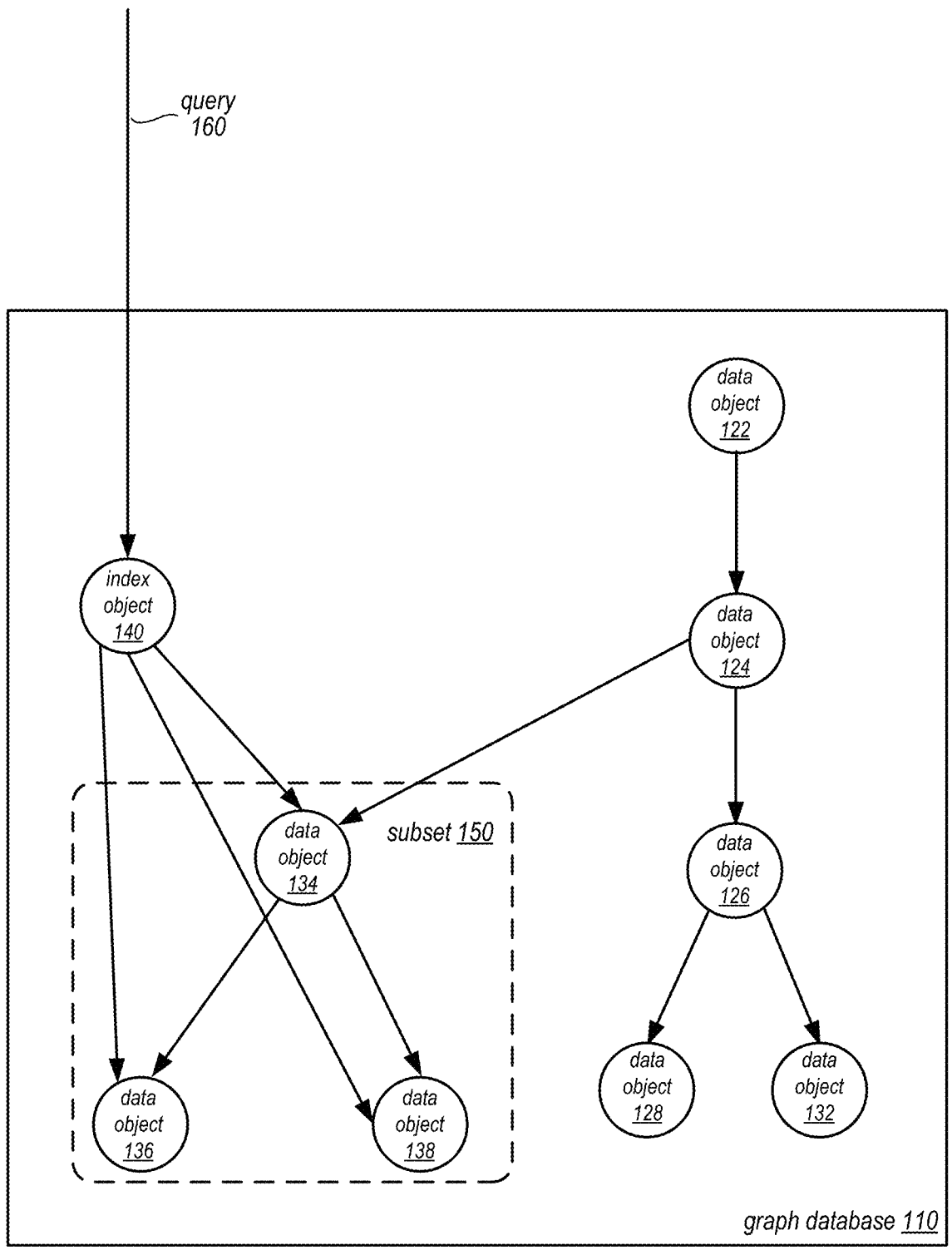
FIG. 1 is a logical block diagram illustrating accessible index objects for graph data structures stored in a graph database, according to some embodiments.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). The words "include," "including," and "includes" indicate open-ended relationships and therefore mean including, but not limited to. Similarly, the words "have," "having," and "has" also indicate open-ended relationships, and thus mean having, but not limited to. The terms "first," "second," "third," and so forth as used herein are used as labels for nouns that they precede, and do not imply any type of ordering (e.g., spatial, temporal, logical, etc.) unless such an ordering is otherwise explicitly indicated.

Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a computer system may be configured to perform operations even when the operations are not currently being performed). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112(f), interpretation for that component.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

DETAILED DESCRIPTION

Various embodiments of accessible index objects for graph data structures stored in a graph database are described herein. Graph data structures offer users the capability to define the relationships between objects of data stored within a data set (e.g., a graph) according to links between the objects, in various embodiments. Because graph structures can grow large or can be used to store varying amounts of data values, indexes can provide alternative links or paths for accessing data objects that are associated with or store values for a common attribute, in some embodiments, that avoid evaluating or locating data objects utilizing the links between data objects. For example, an index for a name attribute of objects within a graph data structure, can provide a common access path to name values that can be discovered without traversing objects which do not have a name attribute, in some embodiments. In various embodiments, an accessible index object can further optimize the performance of accessing attribute values utilizing an alternative access path, by including the accessible index object as part of the graph data structure. In this way, users can define a subset or portion of the graph data structure to which the index object pertains, relieving a system from the burden of automatically maintaining an index for an entire data structure (which for large, frequently updated graph data structures can use up significant resources that could otherwise be devoted to processing queries and other user requests.

FIG. 1 is a logical block diagram illustrating accessible index objects for graph data structures stored in a graph database, according to some embodiments. A graph data structure may include one or multiple data objects organized according to one or multiple links that provide relationships, paths or other association between objects, such as the relationships illustrated between data objects 122, 124, 126, 128, 132, 134, 136, and 138. The data objects can store or be associated with one or multiple attributes (which can have the same or different values among data objects), in some embodiments. As discussed below with regard to FIG. 4, in some embodiments, the different attributes can be defined or organized according to a schema. Because graph data structures can indicate the relationship between data objects, and attributes or other data values associated or stored as part of the data objects, diverse types of data sets can be modeled and maintained in the data structure. For example, an organization chart indicating the reporting structure between company managers and employees can be modeled in a graph data structure that indicates the relationship between employees, and may include data specific to each employee (e.g., name, assignment, years of service, etc.).

Graph database 110 may be a data store that can store both the data objects and associated attributes or data values, but also may maintain the links between data objects in order to provide access to the data objects. For example, a graph database 110 may implement or store objects in accordance with graph theory (e.g., by storing nodes that represent the data object, edges that represent the links or relationships between the data objects, and properties that represent the attributes or other data values associated with or stored as part of the data objects). A directory storage service, such as directory storage service 220 may be one example of a service or system that implements a graph database (along with other functionalities), but other types and/or examples of graph databases, such as databases that utilize resource description framework (RDF) as a data model for storing graph data structures may also include accessible index objects for graph data structures hosted in the graph database.

Index object 140 may include links to a subset 150 of data objects, such as data objects 134, 136, and 138. In this way, a query 160 may directly reference index object 140 in order to query on attributes identified for index object 140, such as name values discussed in the example above. Index object 140 may be updated or modified by user requests, as discussed below with regard to FIGS. 6 and 9, in some embodiments, while in other embodiments the data objects linked to by an index object can be automatically identified. In this way, subset 150 can be expanded or contracted order to adapt to the optimization goals for index object 140 when processing a query, such as query 160 (including expending the population of data objects linked to index object to include links to the entire graph data structure). Graph database 110 may maintain a list or set of index object identifiers (e.g., similar to a set of root nodes or other starting locations for performing graph data structure searches in response to a query) in order to interpret and begin performance of the query by accessing index object 140 to obtain the links to subset 150 of data objects.

Please note, FIG. 1 is provided as a logical illustration of accessible index objects for graph data structures stored, and is not intended to be limiting as to the physical arrangement, size, or number of components, modules, or devices, implementing a graph database, data objects, index objects, or graph data structure.

The specification first describes an example of a network-based directory storage service that stores graph data structures that can include accessible index nodes, according to various embodiments. The example directory storage service may store graph data structures, directories, for many different clients, in various embodiments. Included in the description of the example directory storage service are various aspects of the example directory storage service along with the various interactions between the directory storage service and clients. The specification then describes a flowchart of various embodiments of methods for implementing accessible index nodes graph data structures. Next, the specification describes an example system that may implement the disclosed techniques. Various examples are provided throughout the specification.

Figure 2:
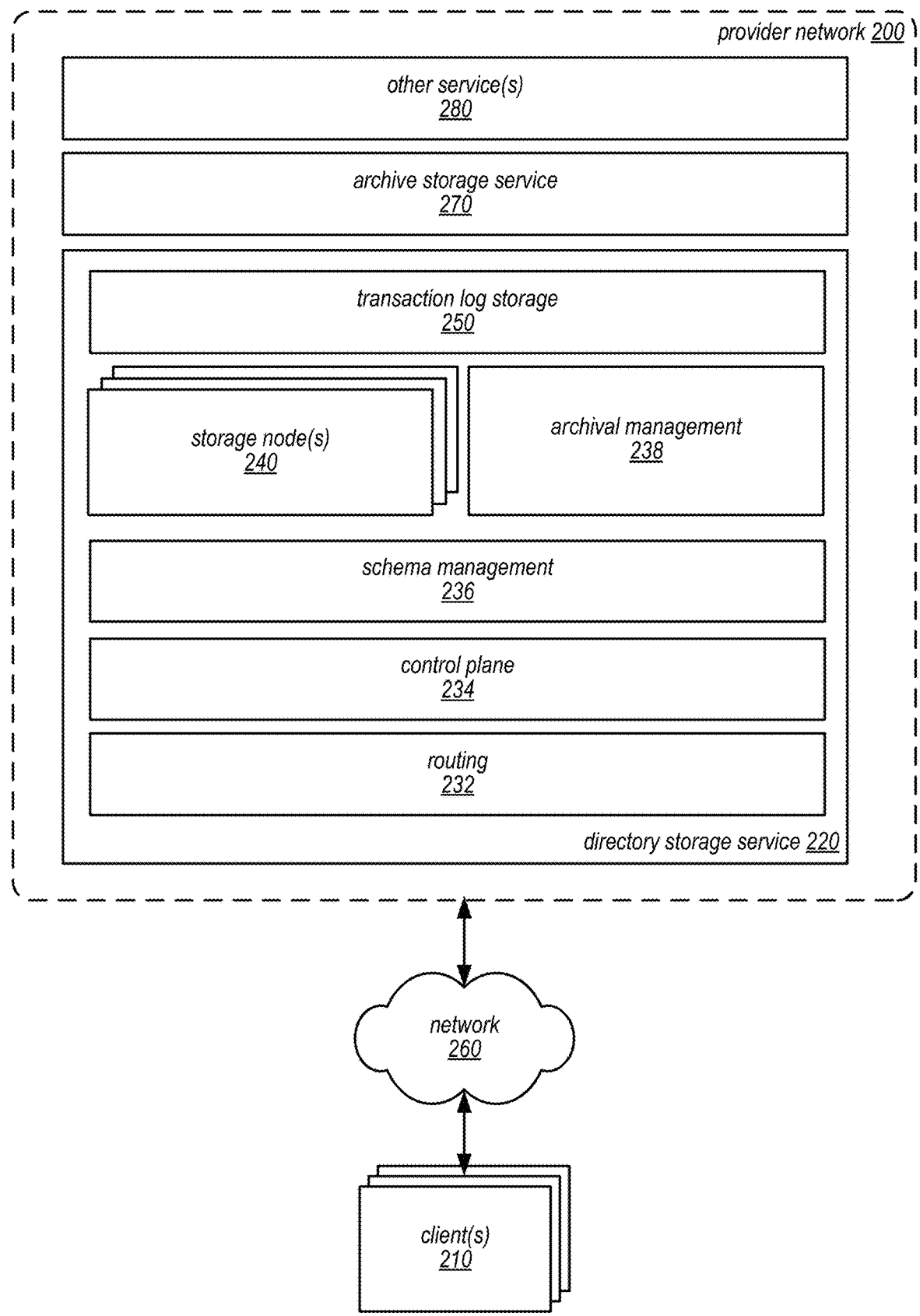
FIG. 2 is a logical block diagram illustrating a provider network that implements a directory storage service that stores graph data structures which may include accessible index objects, according to some embodiments.

FIG. 2 is a logical block diagram illustrating a provider network that implements a directory storage service that stores graph data structures which may include accessible index objects, according to some embodiments. Provider network 200 may be set up by an entity such as a company or a public sector organization to provide one or more services (such as various types of cloud-based computing or storage) accessible via the Internet and/or other networks to clients 210. Provider network 200 may include numerous data centers hosting various resource pools, such as collections of physical and/or virtualized computer servers, storage devices, networking equipment and the like (e.g., computing system 2000 described below with regard to FIG. 10), needed to implement and distribute the infrastructure and services offered by the provider network 200. In some embodiments, provider network 200 may implement a directory storage service 220, described, provide other computing resources or services, such as a virtual compute service and storage services, such as object storage services, block-based storage services, data warehouse storage services, archive storage service 270 and/or any other type of network based services 280 (which may include various other types of storage, processing, analysis, communication, event handling, visualization, and security services, such as a code execution service that executes code without client management of the execution resources and environment). Clients 210 may access these various services offered by provider network 200 via network 260. Likewise network-based services may themselves communicate and/or make use of one another to provide different services. For example, various ones of other service(s) 280 may store, access, and/or rely upon graph data structures stored in directory storage service 220 or may execute code associated with an object in a graph data structure stored in directory storage service 220.

In various embodiments, the components illustrated in FIG. 2 may be implemented directly within computer hardware, as instructions directly or indirectly executable by computer hardware (e.g., a microprocessor or computer system), or using a combination of these techniques. For example, the components of FIG. 2 may be implemented by a system that includes a number of computing nodes (or simply, nodes), each of which may be similar to the computer system embodiment illustrated in FIG. 10 and described below. In various embodiments, the functionality of a given service system component (e.g., a component of the database service or a component of the storage service) may be implemented by a particular node or may be distributed across several nodes. In some embodiments, a given node may implement the functionality of more than one service system component (e.g., more than one database service system component).

Directory storage service 220 may store, manage, and maintain graph data structures, such as a directory structure which may provide one or multiple hierarchies of data objects discussed below with regard to FIG. 4, stored at various ones of storage node(s) 240 (in single tenant or multi-tenant fashion). Directory storage service 220 may, in some embodiments, implement a graph database or data store for creating, accessing, and otherwise managing graph data structures. For example, directory storage service 220 may utilize graph database traversal techniques for searching or updating graph data structures stored on behalf of clients of directory storage service 220. Clients of directory storage service 220 may operate on any subset or portion of the graph data structure with transactional semantics and/or may perform path-based traversals of graph data structures. Such features allow clients to access graph data structures in many ways. For instance, clients may utilize transactional access requests to perform multiple operations concurrently, affecting different portions (e.g., nodes) of the directory structure (e.g., reading parts of the directory structure, adding an object, and indexing some of the object's attributes, while imposing the requirement that the resulting updates of the operations within the transaction are isolated, consistent, atomic and durably stored).

In various embodiments, directory storage service 220 may implement routing layer 232 to direct access requests from internal or external clients to the appropriate storage node(s) 240. For example, routing layer 232 may implement a fleet of routing nodes that maintain mapping information which identifies the locations of a graph data structures on storage node(s) 240. When an access request is received, routing layer nodes may then determine which one of the storage node(s) 240 that hosts the graph data structure identified in the access request to send the access request. Consider a scenario where graph data structures may be replicated across multiple different storage nodes 240 as part of a replica group. Routing 232 may implement various load balancing schemes to direct requests from different clients to different storage nodes within the replica group, so that no single storage node becomes overburdened. Moreover, as storage nodes 240 may utilize tokens to maintain state across different access requests sent by clients so that different storage node(s) 240 may handle each request from the client, routing 232 need not track which storage node is communicating with which client.

Control plane 234 may implement various control functions to manage the storage node(s) 240 and other components of directory storage service 220 that provide storage of graph data structures, such as directing creation and placement of new graph data structures on storage node(s) 240, storage scaling, heat management, node repair and/or replacement. For example, various placement schemes may utilize techniques such as consistent hashing (e.g., based on hashing an identifier for individual hierarchical data structures) to identify storage node(s) to store versions of the graph data structure, or randomly mapping graph data structures to a number hierarchy storage node(s) 240 that form a replica set. To provide heat management, for example, control plane 234 may collect storage node(s) 240 metrics published by each node. Each host may have various thresholds for performance characteristics, such as memory utilization, CPU utilization, disk utilization, and request-rate capacity. When a storage node 240 reports metrics that exceed a threshold (or multiple thresholds), control plane 234 may direct the migration of one or more graph data structures to different storage nodes. Similarly, control plane 234 may detect when certain storage nodes are unable to keep up with access requests directed to a particular replica group for a graph data structure and may provision additional storage node(s) to horizontally scale the replica group to better meet the access request demand.

Figure 3:
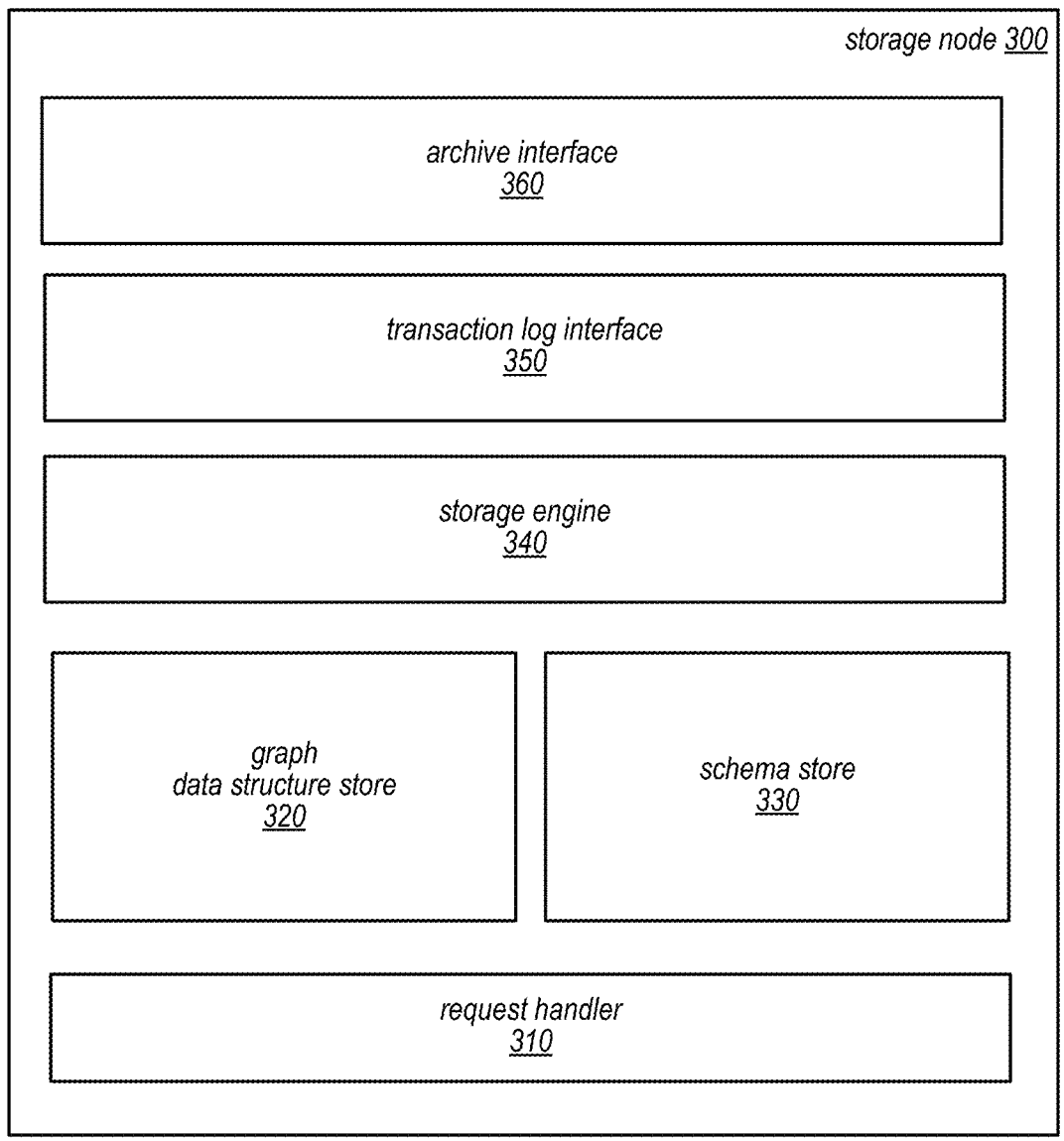
FIG. 3 is a logical block diagram illustrating a storage node, according to some embodiments.

Storage node(s) 240 may maintain and handle requests to graph data structures stored by storage nodes 240 in directory storage service 220. FIG. 3 is a block diagram illustrating a storage node, according to some embodiments. Storage node 300 may implement request handler 310 to process access requests, such as those request discussed below with regard to FIGS. 7 and 8, and pass along appropriate instructions or requests to other components, such as storage engine 340, transaction log interface 350 or archive interface 360. For example, access request handler 310 may interpret various requests formatted according to a programmatic interface, such as an application programming interface (API). Access requests may include various, such as various access requests to create, update, attach, detach, delete and query objects in a graph data structure, and access requests to define, populate, discover, and query a local index object as discussed below.

Figure 4:
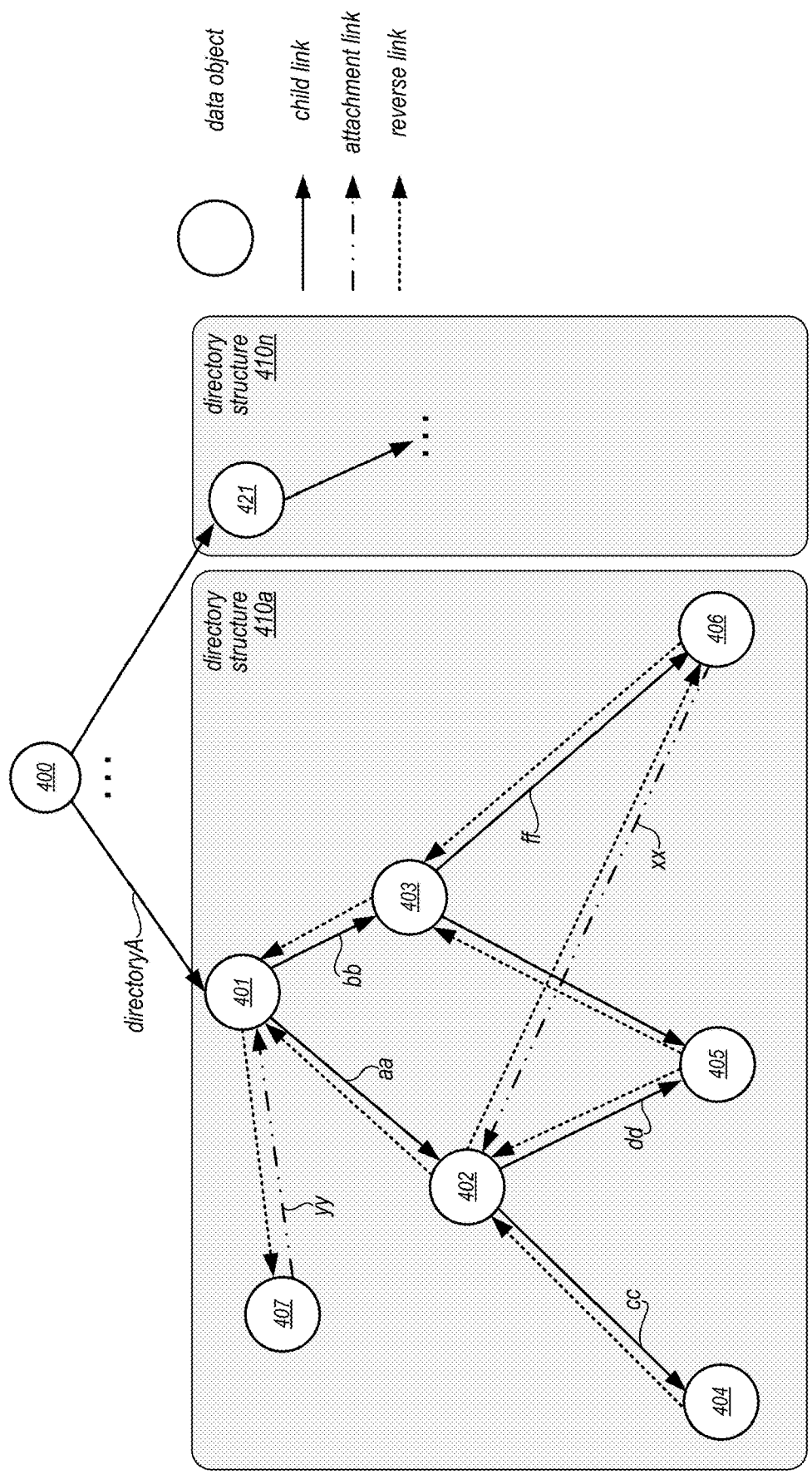
FIG. 4 is a logical block diagram illustrating a data model for a graph data structure, a directory structure, according to some embodiments.
Figure 5:
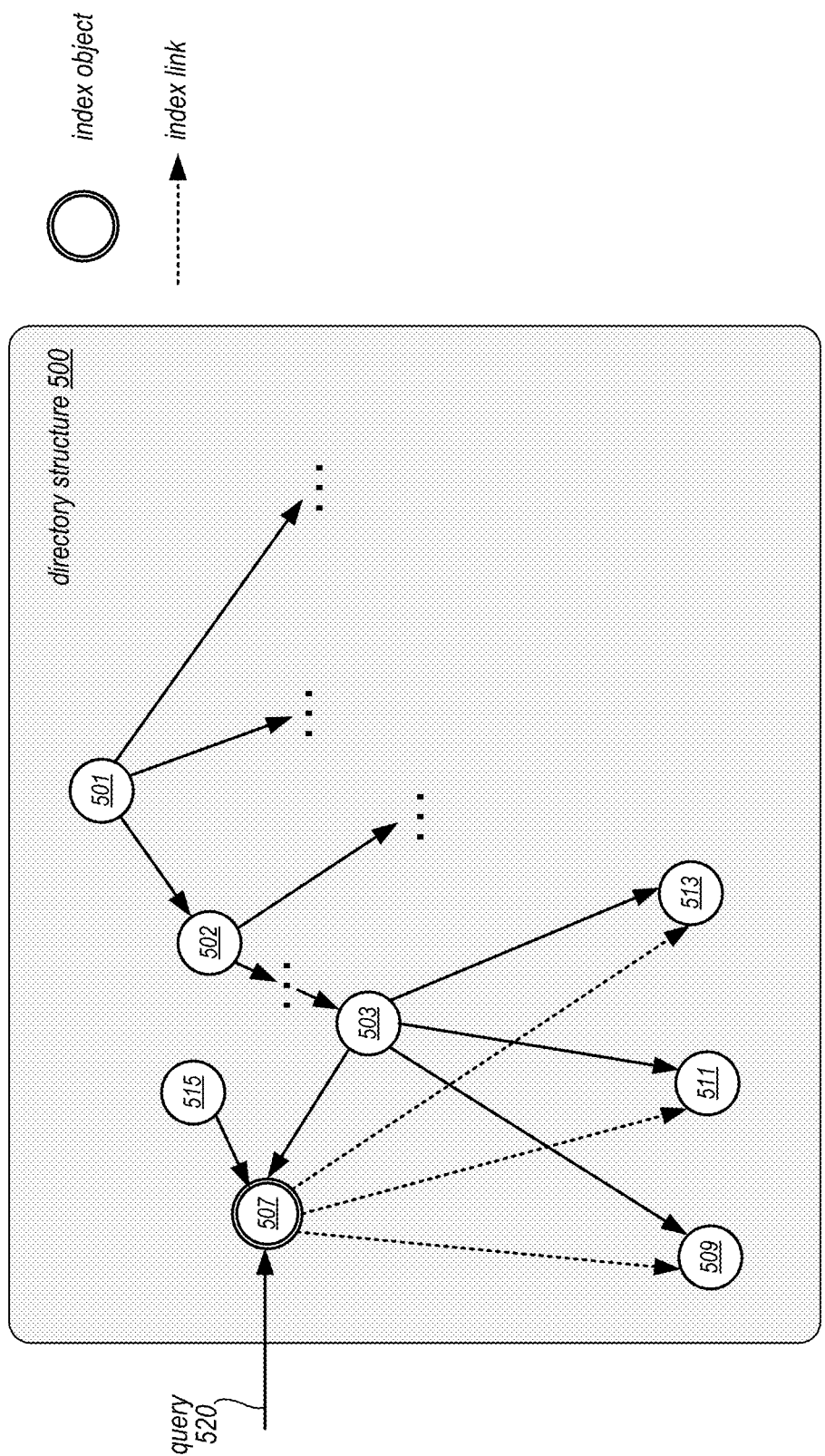
FIG. 5 is a logical block diagram illustrating an example index object for a subset of objects of a directory structure, according to some embodiments.

In various embodiments, storage engine 340 may be a storage engine that interacts with structure or format of data as it is stored in graph data structure store 320 (e.g., a key-value storage engine for data maintained in key-value storage format, relational data storage engine for data maintained in a relational storage format, etc.) and schema store 330 which may maintain a schema that is applied to the graph data structure maintained in graph data structure store 320, which may be maintained according to the models discussed below with regard to FIGS. 4 and 5. In some embodiments, graph data structure store 320 may be partially or completely implemented in memory or other quick access storage devices, such as random access memory devices (RAM), as well as utilizing persistent block-based storage devices to store graph data structures, including magnetic disk or solid state drives. In some embodiments, caching techniques may be implemented so that frequently accessed portions of data, such as frequently access portions of graph data structures are maintained in memory components whereas other portions are maintained in block-based persistent storage components. Storage node 300 may operate multi-tenant storage for graph data structures so that different graph data structures maintained on behalf of different clients, accounts, customers, and the like may be maintained in graph data structure store 320 and schemas applied to the graph data structures in schema store 330. For example, storage node 300 may participate in different replica groups with different storage nodes for the different graph data structures stored at storage node 300.

Transaction log interface 350 may provide capabilities to interact with (e.g., validate transactions) with respect to the logs corresponding to graph data structures stored in transaction log storage 250 for the graph data structures, according to the various techniques. Transaction log storage 250 may provide consistent storage for versioned graph data structures, according to some embodiments. Multiple clients may perform various access requests to a graph data structure concurrently, such as various write requests. In a least some embodiments, a replica group may include multiple storage nodes that maintain versions of the graph data structure that are available for servicing various access requests from the multiple clients. For example, clients can submit different write requests to storage nodes according to a routing layer (e.g., routing layer 232) which may direct access requests from each client to a different storage node in the replica group according to a load balancing scheme. Upon receiving the request, each storage node may perform various operations upon a version of the graph data structure at the storage node, then offer the writes to transaction log storage 210 for commitment to graph data structure log stored in transaction log storage (including various information such as the affected or accessed data by performing the write request, the write request itself, and a transaction sequence number of other indication identifying the point-in-time of the current version of the graph data structure at the storage node). Indications of commitment or conflict may be provided back from transaction log storage 250 to the respective storage nodes. For those writes that are committed, the graph data structure log may be read and committed writes applied to the respective versions of the graph data structure maintained at the multiple storage nodes.

Similarly, archive interface 360 may be implemented to retrieve archived transactions or snapshots to service an access request for historical changes to the graph data structure, a historical query, or other access requests that require a version of the graph data structure that is older than that maintained in graph data structure store 320. In some embodiments, an archival management layer 238 may utilize transactions stored for different graph data structures stored in respective transaction logs in transaction log storage 250 to generate and store snapshots of the graph data structure at different points in time in archive storage service 270. For example, archival management 238 may determine when snapshots of a graph data structure should be captured, provision appropriate storage locations in archive storage service 270, and direct archive worker nodes (not illustrated) to perform the read, write, and other operations to generate and place the snapshots in archive storage service 270. Similarly, archival management 238 may direct the copying and storage of individual log records/transactions and/or groups of log records and transactions to be stored as part of an archived transaction log for graph data structures in archive storage service 270. Archival management 238 may read the graph data structure log to retrieve writes for transmission as archived transactions or snapshots of the graph data structure maintained in archive storage service 270. Archival management 238 may then periodically or aperiodically update an archived log in archive storage service 270 and generate and send new snapshots to be maintained as part of archived snapshots in archive storage service 270. In this way, the graph data structure can be recreated at any point-in-time, for example by loading a snapshot onto a storage node and applying transactions from an archived log to reach a certain transaction sequence number so that the version of the graph data structure at the storage number is consistent with a specified point-in-time.

Turning back to FIG. 2, transaction log storage 250 may provide a fault tolerant, high performance, durable, log publishing service. Transaction log storage 250 may be used as a commit log underlying strongly consistent distributed applications such as databases, key-value stores, and lock managers, and as illustrated in FIG. 2 directory storage service 220 providing graph data storage, as discussed above. Transaction log storage 250 may provide strong consistency guarantees and support constraints between committed records, to enable features like deduplication, sequencing, and read-write conflict detection. For example, in various requests transaction log storage 250 may determine whether or not to commit changes to graph data structures (e.g., write requests and other modifications) by examining a proposed transaction for conflicts with other committed transactions. Such a feature may provide a fine-grained locking model over the graph data structure (e.g., only those portions of the graph data structure affected by a conflict between transactions may be locked). Transaction log storage 250 may maintain a separate log or chain of log records for each graph data structure, serving as an authoritative definition of the changes to the state graph data structure over time. Transactions may be ordered according to transaction sequence numbers, which may be monotonically increasing to reference the state of a graph data structure at individual points in time. Note that in some embodiments, transaction log storage 250 may be a separate network-based storage service implemented as part of provider network 250 external to directory storage service 220.

Generally speaking, clients 210 may encompass any type of client configurable to submit network-based services requests to provider network 200 via network 260, including requests for directory services (e.g., a request to create or modify a graph data structure to be stored in directory storage service 220, etc.). For example, a given client 210 may include a suitable version of a web browser, or may include a plug-in module or other type of code module that can execute as an extension to or within an execution environment provided by a web browser. Alternatively, a client 210 may encompass an application such as a database application (or user interface thereof), a media application, an office application or any other application that may make use of persistent storage resources to store and/or access one or more graph data structures to perform techniques like organization management, identity management, or rights/authorization management. In some embodiments, such an application may include sufficient protocol support (e.g., for a suitable version of Hypertext Transfer Protocol (HTTP)) for generating and processing network-based services requests without necessarily implementing full browser support for all types of network-based data. That is, client 210 may be an application that can interact directly with network-based services platform 200. In some embodiments, client 210 may generate network-based services requests according to a Representational State Transfer (REST)-style network-based services architecture, a document- or message-based network-based services architecture, or another suitable network-based services architecture.

In some embodiments, a client 210 may provide access to network-based services to other applications in a manner that is transparent to those applications. For example, client 210 may integrate with an operating system or file system to provide storage in accordance with a suitable variant of the storage models described herein. However, the operating system or file system may present a different storage interface to applications, such as a conventional file system hierarchy of files, directories and/or folders. In such an embodiment, applications may not need to be modified to make use of the storage system service model. Instead, the details of interfacing to provider network 200 may be coordinated by client 210 and the operating system or file system on behalf of applications executing within the operating system environment.

Clients 210 may convey network-based services requests (e.g., access requests directed to graph data structures in directory storage service 220) to and receive responses from network-based services platform 200 via network 260. In various embodiments, network 260 may encompass any suitable combination of networking hardware and protocols necessary to establish network-based-based communications between clients 210 and platform 200. For example, network 260 may generally encompass the various telecommunications networks and service providers that collectively implement the Internet. Network 260 may also include private networks such as local area networks (LANs) or wide area networks (WANs) as well as public or private wireless networks. For example, both a given client 210 and network-based services platform 200 may be respectively provisioned within enterprises having their own internal networks. In such an embodiment, network 260 may include the hardware (e.g., modems, routers, switches, load balancers, proxy servers, etc.) and software (e.g., protocol stacks, accounting software, firewall/security software, etc.) necessary to establish a networking link between given client 210 and the Internet as well as between the Internet and network-based services platform 200. It is noted that in some embodiments, clients 210 may communicate with network-based services platform 200 using a private network rather than the public Internet.

Different types of graph data structures may be stored, managed, and or represented in different ways. FIG. 4 is a logical block diagram illustrating a data model for a graph data structure, a directory structure, according to some embodiments. An object may be the basic element of a directory structure, such as directory structures 410a or 410n and may be represented with circles in the graph depicted of FIG. 4 (e.g., objects 400, 401, 402, 403, 404, 405, 406, 407, and 421). An object may have a globally unique identifier (GUID), zero or more attributes (key, value pairs), and zero or more links to other objects. In some embodiments, a directory may be one type of object which has zero or more child links to other objects, either directories or resources. Directory objects may have zero or one parent directory object, implying that directory objects and links define a tree structure, in some embodiments. In FIG. 4, objects 401 and 421 are examples of a directory objects. Object 400 may be a root object that is the logical root multiple directory structures 410 and may not be visible to clients of directory storage service 220, in some embodiments. Some objects may be resource or other data objects (such objects 402, 403, 404, 405, 406, and 407) in a directory structure 410. A resource object may have a unique external Id (e.g., client specified) and client-defined attributes. Data objects can have more than one parent object, in some embodiments, (which would allow for some graph data structures to be configured as a Directed Acyclic Graph (DAG). Object 405 in FIG. 4 is an example of a resource object and it has two parents (objects 402 and 403).

In some embodiments, multiple types of data objects may be implemented. For example, in some embodiments, policy objects may be a type of data object with two user-defined attributes: a policy type and policy document (e.g., describing a policy applied to applicable objects). For example, object 406 in FIG. 4 may be an example of a policy object. Another type of object may be an index object, as discussed in detail below with regard to FIGS. 5-8. For example, an index object may be an index on various attribute values of objects in the child objects and other descendant objects of the object to which the index object is attached. For example, if object 407 is an index object, then index object 407 may provide an index object for the attributes of child objects 402 and 403 as well as descendant objects 404, 405, and 406.

In some embodiments, a link may be a directed edge between two objects defining a relationship between the two objects. There may be many types of links, such as client visible link types and another link type for internal operation implementation. In some embodiments, a child link type may create a parent—child relationship between the objects it connects. For example, child link 'bb' connects object 401 and object 403. Child links may define the hierarchies of directory structures 410, in some embodiments. Child links may be named in order to define the path of the object that the link points to, in some embodiments. Another type of client visible link may be an attachment link. An attachment link may apply an object, such as a policy object, to another object, such as a directory object. Attachment links may not define the hierarchy of directory structures 410, in some embodiments. For example, attachment link 'xx' applies the policy attribute stored in policy object 406 to object 402. Objects can have multiple attachments. In some embodiments, some attachment restrictions may be enforced, such as a restriction that not more than one policy object of any given policy type can be attached to a same object. A non-client visible type of link or implied link type may also be implemented in some embodiments, a reverse link. Reverse links may be used for optimizing traversal of directory structures 410 for common operations like object look-ups (e.g., policy lookups). Directory storage service 220 may maintain reverse links in the opposite direction of child and attachment links.

In various embodiments, objects in directory structures 410 can be identified and found by the pathnames that describe how to reach the object starting from the logical root object 400, starting with the link labeled "/" and following the child links separated by path separator "/" until reaching the desired object. For example, object 405 can be identified using the path: "/directoryA /aa/dd". As some objects may be children of multiple directory objects, multiple paths may identify an For example, the following path can also be used to identify object 405: "/directoryA /bb/ee". As directory structures 410 may be a collection of objects whose boundary is defined by the hierarchy of those objects in the collection (e.g., the resulting hierarchical data structure, such as the tree or DAG created by the links between objects). In this way, directory structures 410 may represent separate, independent, or partially independent, organizations.

To store the illustrated directory structures in an underlying data store, the described objects, links attributes, and the like may be modeled after a Resource Description Framework (RDF) data, in some embodiments. To maintain multiple versions of the hierarchical data structures, versioning information may also be included to express how the data has changed over time. RDF data may be structured as (Subject, Predicate, Object) tuples. When including additional versioning information this structure may become:

(Subject, Predicate, Object, Version, PreviousVersion). To represent the hierarchical data structures based on RDF, there may be multiple types of RDF predicates. In some embodiments, one type of RDF predicates may represent links of the hierarchical data structure and another type of RDF predicates may represent attributes of the hierarchical data structure. Different types of predicts may represent the hierarchical data structure differently. Link predicates may be between two objects, whereas attribute predicates may be between an object and a value. Since a single object might participate in several predicates of the same type, but with different values, predicates may begin with a common prefix and end in some additional type or naming information to aid in lookups. For example, the version entry in a tuple of a predicate may be the logical timestamp (e.g., transaction sequence number) at which the link or attribute was created, as all changes to a hierarchical data structure may utilize the transaction resolution process provided by transaction log storage 250 and may be assigned an ordered logical timestamp by transaction log storage 250.

Storage nodes may maintain a current version of a directory structure 410 and past versions of a hierarchical data structure. In at least some embodiments, different respective tables may be maintained for each directory structure, one table that stores the data for the current version and another table that stores immutable records for the previous versions. In various embodiments a current version table or previous versions table may be accessed to perform various operations for a directory structure. For example an access request may specify a query: "Find all children for Object whose ID is GUID_401 select GUID_401.child.* from CurrentVersion" or a query: "Find all policies for a resource object whose ID is GUID_405 along all paths to the root. To service such queries, a depth first traversal may be executed along the parent links. At each object along the path to the root, the following internal queries may be executed: internal query 1: "Find if the object has policies: select GUID_405.link.HasPolicy.* from CurrentVersion;" internal query 2: "If the object has policies returned in internal query 1, use the value from the link to get the policy document value from the policy object: select GUID_406.link.PolicyDoc from CurrentVersion;" internal query 3: "Find all parents for current object and perform internal queries 1-3 for each parent object until reaching the root of the directory structure. Please note that previous examples are not intended to be limiting as to the format, structure, syntax, or other ways in which queries may be expressed or processed with respect to graph data structures.

In at least some embodiments, a schema may be applied to a graph data structure, such as a directory or sub-directory illustrated in FIG. 4. A schema may include one or multiple schema classes, which may be organized according to inheritance (e.g., parent and child) links and named links. A schema class may represent a set of attributes that can be attached to an object, in some embodiments. Each individual object may have any number of classes associated with it, and each class applied to the object may maintain its own independent set of attributes.

A schema may be treated as a set of metadata which can be referred to from a variety of different locations (e.g., from different directory structures). For example, if a directory structure references a schema, that directory structure has "applied" the referenced schema. In at least some embodiments, all data within a directory structure that applies a schema may have to conform to that schema. A schema can be applied to multiple directories, serving as a blue-print for constructing and maintaining the different directories. Once a schema is applied to a directory structure, it may be extended or modified from the originally referenced form of the schema, as discussed below in some embodiments. A schema may itself be modified so that each directory that applies the schema can apply the modified version of the schema (if desired), in some embodiments. Schema contents (e.g., classes, links, etc.) may be consumed by programmatically by clients accessing the directory (e.g., via API calls). By exploring the schema, clients can discover the full set of classes, including attributes and constraints of the classes, which apply to data within the directory.

Inheritance links may define a parent or child schema class for a schema class. In some embodiments, a schema class may reference one or more parent schema classes. Attributes may not be inherited from parent schema classes, in some embodiments. However, when an object is created or associated with a schema class, the object may become an instance of ancestor schema classes as well, in some embodiments. For example, if a "Manager" class has an "Employee" class as a parent, and an "Employee" class has a "Person" class as a parent, assigning a new object to the "Manager" class may automatically assign the "Employee" and "Person" to the object. This may allow for the effect of inheriting the attributes of the classes, but without those attributes crossing into the derived class's attribute set, in some embodiments. Attribute sets for each class may be permanently distinct. Inheritance links may be defined at schema class creation time, and may be immutable, in some embodiments. In this way, concrete assumptions about the presence and absence of attributes for an object can be made, which facilitates modeling object hierarchies, in various embodiments. Immutable class inheritance may also avoid scenarios where a parent class's attributes are either absent (in the case of a parent class added after the object was created) or stranded (in the case of a parent class removed after the object was created). In other embodiments, however, a schema classes may inherit attributes directly from parent schema classes.

A class may be described by a set of class data, such that each object that is an instance of the class may include that data. For example, class data may include a name, description (e.g., for developers, administrators, or consumers), constraints (e.g., an object that is an instance of this class 'must be child of an object that is an instance of class X', 'child objects must be instances of class Y'), permission(s) (access controls for the object), attribute(s), named link(s), inheritance (e.g., parent or child classes), and/or a tag, in some embodiments. One or multiple attributes may be included in a class, and may include various data such as attribute data. In this way, a class can describe what data is stored as part of an object and how that data may be interacted with by a client. For example, permissions assigned to a schema class (or attribute or schema) may be considered when requests are made against a schema (to read or apply it), or against an applied schema (to read or write directory data). Permissions may be defined on the schema class, but influence all read operations related to objects that are instances of that class. Consider a scenario where a client attempts to read a set of attribute fields on an object. The object may be an instance of a schema class and the schema class's permissions may be included in the authorization of that request. In this way, a schema class's permissions may state a specific set of clients (users or other entity associated with an identity) is allowed to read a specific list of attributes on any instances of that schema class. Similar permissions could be enforced with respect to other operations for objects that are instances of that schema class, including creation and deletion operations. Note that, in some embodiments, permissions may only apply to the set of attributes for a specific schema class, and not for the directory object itself, which is an instance of the schema class. For instance, a client could be able to read and modify one set of attributes of an object that is an instance of one schema class, and be unable to read another set of attributes on the same object according to different permissions for the other set of attributes of a different schema class (which the object is also an instance of).

Attribute data may include an attribute name, description, type (e.g., string, int, code, code pointer, etc.), execution data, permissions (e.g., who can read/write the attribute data value), and default value (e.g., which may be provided if not overwritten for a particular instance of the class). Different attribute data types may include, but are not limited to, String, Integer, Boolean, Decimal, and Date, to facilitate sorting or selecting objects based on inequality comparators (e.g., querying for a bounded or unbounded interval in a range). In some embodiments, attributes may be defined as "shared". Shared attributes may participate in a directory-global namespace which may be managed by schema management 236 in FIG. 2. When two schema classes define shared attributes with the same name, the values of those shared attributes may be shared across the schema classes. For example, if a "User" schema class is defined with a shared "surname" attribute, and an "Employee" schema class attribute is also defined with a shared "surname" attribute, an update of one attribute will also update the other. In some embodiments, only one value of a shared attributed may be stored. In order to update a shared attribute, a new value may have to be validated for all attribute definitions of the different class schemas that share the attribute and apply to the object, in some embodiments. Attribute constraints may be automatically validated or validated/interacted with as part of execution data of client-specified code, in some embodiments. Constraints may include min/max values, min/max lengths (e.g., for strings), acceptable character sets, or regular expression-based validation. In some embodiments, an attribute may be code that is triggered for execution when an object that is an instance of the class that includes the attribute is accessed (e.g., for create, read, update, or delete).

A schema may be stored in various ways. In some embodiments, a schema may be stored as a document (e.g., a JSON document) in a standard, hierarchical structure or in another language independent data format. The document may contain all shape-related information for the schema, including attribute type, validation rules, indices, and other auxiliary information. Indices, and information which loses context when moved between accounts (e.g., permissions, references to external resources like external code execution platforms, etc.), may be represented separately in a manner which makes them easily distinguishable from the core schema shape information (e.g., in a separate JSON document). Permissions for a schema may be stored outside of the document, in some embodiments. For example, schema classes may be represented as children of a "schema class" node attached to the root node, forming the structural schema class hierarchy. Permissions may then be associated with each of the schema classes, in some embodiments, which can then be evaluated similar to perform a directory structure lookup operation as discussed above. Additional, clients can register for directory update event notifications without requiring mutation of the schema definition, in some embodiments.

FIG. 5 is a logical block diagram illustrating an example index object for a subset of objects of a directory structure, according to some embodiments. Directory structure 500, like directory structures 410 in FIG. 4, may illustrate a directory structure that includes an index object 507. Index object 507 may be created, according to the various techniques discussed below with regard to FIGS. 6 and 9. Links between index object 507 and objects 509, 511, and 513, may be included as part of index object 507 in order to provide a path to the indexed attributes of objects 509, 511, and 513 that by pass traversing the links from the root object of the directory structure 501, 502, and so on. Index object 507 may also have a link to a parent object 503 for index object 507. For example, query 520, as discussed below with regard to FIG. 7, may identify index object 507 so that the references, pointers, or other information identifying the location of objects 509, 511, and 513 may be found by accessing index object 507 instead of accessing and traversing objects not indexed in directory structure 500.

In some embodiments, data objects can be created and attached to an index object, for which no other relationships between the additional object and other objects in the directory structure exist. For example, object 515 may be data object that is attached to index object 507. Data from object 515 may be included or used to answer query 520 directed to index object 507, in some embodiments. Information that describes the index (which could be changed independently from index 507) could be stored or associated with object 515 and included or used to provide a result for query 520, in one embodiment.

Figure 6:
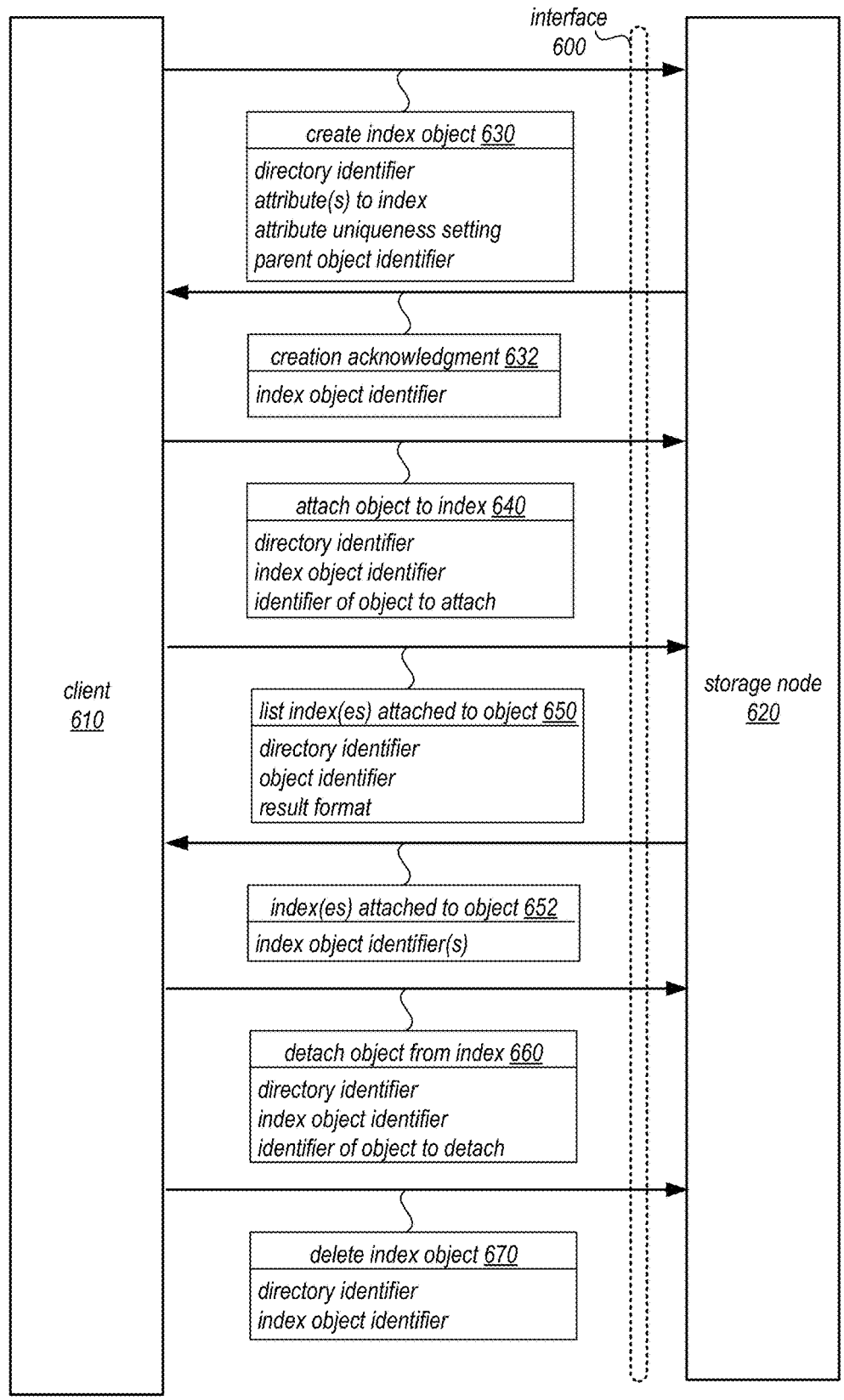
FIG. 6 is a logical block diagram illustrating interactions to manage an index object included in the graph data structure, according to some embodiments.

FIG. 6 is a logical block diagram illustrating interactions to manage an index object included in the graph data structure, according to some embodiments. Storage node 620 may be a storage node like storage nodes 240 or 300 discussed above with regard to FIGS. 2 and 3. Storage node 620 may implement a request handler, like request handler 310, to handle requests to manage or access an index object (e.g., dispatched to storage node by routing layer 232 in FIG. 2) or perform other actions with respect to the index object as discussed below.

Client 610 may be a client of directory storage service 220, similar to client(s) 210 in FIG. 2 above. Client 610 may send a request to create an index object 630 via interface 600. Interface 600 Interface 600 may implement respective application programming interfaces (APIs) for invoking or otherwise requesting the performance of operations such as create index object 630 (or other operations such as attach object to index request 640, list index(es) attached to object 650, detach object from index 660, and delete index object 670, among others). Interface 600 may be provide a command line interface and/or graphical user interface for submitting various requests from client 610 (e.g., over a network connection as illustrated in FIG. 2 or via input receive locally at the storage node 620, using a local interface).

Create index object request 630 may include a directory identifier, in various embodiments. The directory identifier may identify the directory structure in which the index object is to be included and may inform routing 232 of which storage node, storage node 620, is to perform the request (e.g., as storage node 620 may store some or all of the directory structure. Create index object request 630 may identify the attribute(s) to index. For example, as noted above an attribute may be defined as part of a class or facet applied to data objects as part of a schema for a directory structure. Create index object request 630 may indicate whether only unique attributes are to be indexed according to an attribute uniqueness setting, in some embodiments. For example, only one data object with a value for an indexed attributed, an email attribute="john.doe@mail.com" may be allowed to be included in the index object if the uniqueness setting is enabled. Create index object 630 may also indicate a parent object to link the index object to (e.g., by include a reference, identifier, mapping, or other information to provide a storage location in underlying storage for the parent object in order to include a reference, pointer, or other information identifying the storage location of the index object as part of links from the parent object), in some embodiments. Storage node 620 may create the index object, allocating, writing, or otherwise inserting data representing the index object in the underlying data store. An acknowledgment 632 of successful completion of the creation request may include an identifier for the index object, in some embodiments. Error responses may be returned if an error is detected in the formation of the request 630 or in the performance of the creation of the index object, in some embodiments.

Client 610 may send a request to attach an object to the index objet 640 via interface 600 to storage node 620, in some embodiments. Attach object to index request 640 may specify the directory identifier, similar to create index object request 630. Attach object to index 640 request may also include the identifier of the index object and the identifier of object to attach, in some embodiments. Storage node 620 may include a reference to the object in the links of the index object stored in the underlying data store. Although not illustrated, an acknowledgement indicating success of the attachment may be received (e.g., including the identifier of the attached object). If the request was malformed, unauthorized, or in the event the attachment would violate the attribute uniqueness setting for the index object an error indication may be sent in response to client 610, in some embodiments.

Client 610 may send a request to list index(es), if any, attached to an object 650. List index(es) attached to an object request 650, may include the directory identifier and identifier of the object, in some embodiments. In some embodiments, a consistency level or requirement may be specified for the request 650. For example, in some embodiments, the request 650 may specify whether it should be performed in serializable fashion (e.g., waiting or rejecting the request until all updates or changes to the data objects or index object proceeding the request have been completed) or in an eventual consistent fashion (e.g., where a state of the data objects and/or index object is returned that may (or may not) be the current state). Storage node 620 may identify those index objects that are linked to the object (e.g., by searching the directory structure or by following reverse links from the data object to index objects, which may also be stored as part of the data object). A response 652 indicating the index(es) attached to the object 642 may be received, in some embodiments. For example, the identifiers of index object(s) attached to the data object may be received. If the request was malformed or unauthorized, an error indication may be sent in response to client 610, in some embodiments.

Client 610 may send a request to detach an object to the index object 660 via interface 600 to storage node 620, in some embodiments. Detach object to index request 660 may specify the directory identifier, similar to create index object request 630. Detach object to index 660 request may also include the identifier of the index object and the identifier of object to detach, in some embodiments. Storage node 620 may remove or delete a reference to the object in the links of the index object stored in the underlying data store. Although not illustrated, an acknowledgement indicating success of the detachment may be received (e.g., including the identifier of the detached object). If the request was malformed or unauthorized, an error indication may be sent in response to client 610, in some embodiments.

Client 610 may send a request to delete an index object 670 via interface 600 to storage node 620, in some embodiments. Deletion of the index object request 670 may specify the directory identifier, similar to create index object request 630. Deletion of the index object request 670 may also include the identifier of the index object to delete, in some embodiments. Storage node 620 may remove or delete a reference to the object in the links of the parent object and remove, delete, or mark for deletion (to ignore) or otherwise update the index object stored in the underlying data store to prevent further access to the index object. Although not illustrated, an acknowledgement indicating success of the detachment may be received (e.g., including the identifier of the detached object). If the request was malformed, unauthorized, or in the event an object remains liked to the index object, an error indication may be sent in response to client 610, in some embodiments, that the deletion failed to complete.

Figure 7:
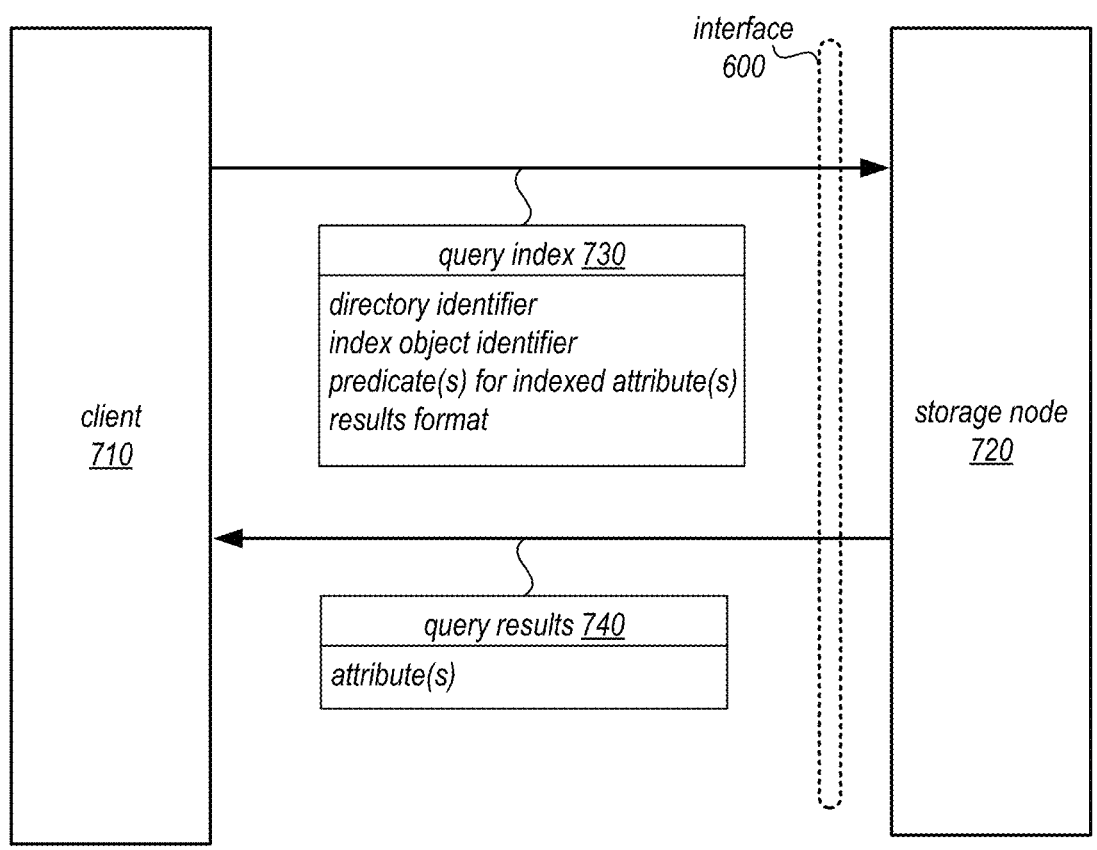
FIG. 7 is a logical block diagram illustrating interactions to access an index object in a graph data structure to perform a query, according to some embodiments.

FIG. 7 is a logical block diagram illustrating interactions to access an index object in a graph data structure to perform a query, according to some embodiments. Similar to storage node 620 in FIG. 6 discussed above, storage node 720 may store some or all of a hierarchical data structure, such as the directory structure, illustrated in FIG. 4, for providing access in response to queries for information stored as part of the different objects in the directory structure. Interface 600 may implement an application programming interface (API) for invoking or otherwise requesting the performance of a query (or other operation to retrieve or return information stored as part of the data objects). In other embodiments, interface 600 may support languages or protocols for querying directories or other graph structures, such as GraphSQL, Gremlin, and so on.

Client 710, similar to client 610 above may send a request via interface 600 to query an index object 730. The request may be dispatched directory storage service routing 232 to the appropriate storage node to handle the query, storage node 720. Query index request 830 may specify a directory identifier (e.g., a unique identifier associated with an account for directory storage service 220 or provider network 200). The directory identifier may, be used to check whether a user associated with the request 730 has the appropriate credentials, identity, or role to perform a query, in some embodiments. The directory identifier may be used by a routing 232, in some embodiments, to determine which storage node to send the query request. Query index request 730 may also include an index object identifier, in some embodiments. For instance, the acknowledgment of a creation request may include an index identifier that can be used to manage and direct queries to the index object. Query index request 730 may also include predicates for indexed attributes, in some embodiments. Predicates may include Boolean expressions or other criteria which may indicate whether a value of an attribute identified in the predicate should be included in a result of the query (e.g. whether a value satisfies the Boolean expression as "true"). Query index request 730 may also include parameters or values to manipulate, shaper, or otherwise format the results (e.g., group results, limit the number of results, result pagination, and so on).

Storage node 720 may perform the query, accessing the storage node to traverse the links of the query (e.g., by accessing storage locations according to pointers or other references included in the index object). Attribute values that satisfy the query may be returned as part of the query results 740 to client 710. In some embodiments, the results 740 may identify the data objects that are stored or are associated with the attribute values that satisfy the query (e.g., by pair data object identifiers with attribute values). In some embodiments, other attribute values of the identified data objects may be obtained, in addition to those attribute values indexed, whereas in other embodiments only the index attribute values may be returned.

Although not illustrated, error responses may be returned in response to query 730, in some embodiments. For example, mal-formed queries 730 (e.g., with invalid directories, index objects, attribute values, predicate formulations, and so on) may be returned with an error response. In some embodiments, other errors such as invalid security credentials or authorization, request limits, or other performance errors may be indicated.

Figure 8:
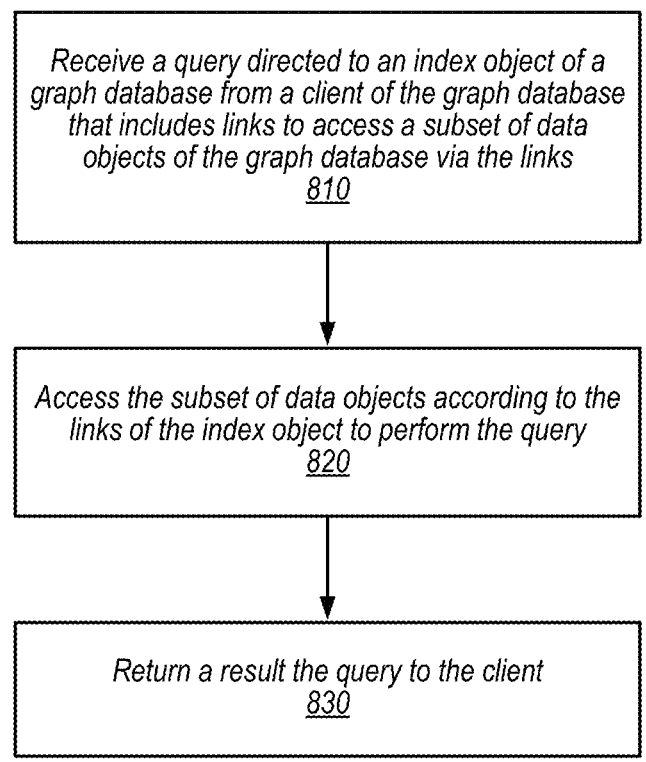
FIG. 8 is a high-level flowchart illustrating methods and techniques implement accessible index objects for graph data structures stored in a graph database, according to some embodiments.

The directory storage service, access requests, and other techniques discussed in FIGS. 2 through 7 provide examples of a directory service storing directories or other graph data structures for a client and implementing accessible index objects in the graph data structure in different scenarios. However, various other types of graph data structure storage systems, such as graph databases may implement accessible index objects in a graph data structure stored in the graph database, which may utilize other numbers of types of components. FIG. 8 is a high-level flowchart illustrating methods and techniques implement accessible index objects for graph data structures stored in a graph database, according to some embodiments. Various different distributed data stores including the embodiments described above may implement the techniques described below.

As indicated at 810, a query directed to an index object of a graph database may be received form a client of the graph database, in various embodiments. As discussed above, with regard to FIG. 1, the index object may include links to access a subset of data objects of the graph database via the links, in some embodiments. For example, the query may be received via an interface, such as interface 600 discussed above with regard to FIGS. 6 and 7, to identify the index object, a graph data structure (e.g., a directory structure) that includes the index object, as well as predicates, result formats or instructions, among other information that may be included in the request. In some embodiments, a graph query language, such as GraphQL, Cypher Query Language, Gremlin, GSQL, or other languages, protocols, or formats that can specify graph data structure queries or operations that request information by accessing the graph data structure, such as SPARQL. The query may be submitted programmatically over a network-based interface (e.g., via an API) or according to a command line interface or graphical user interface (e.g., locally at the host of the graph database).

In at least some embodiments, the query may specify one or more attributes, features, or values stored and/or associated with data objects linked to the index object as part of a predicate (or other indication of desired results). For example, the query may specify a range of values associated with a feature (e.g., a range of "names" according to an alphabetical ordering, such as "name" values between "G" and "L"). In some embodiments, predicates may specify operations that manipulate results of another predicate (e.g., filtering out specific values, such as exclude name="James"). In some embodiments, multiple users may read to or write from the subset of data objects linked to the index object, which could be performed concurrently or partially overlapping with the query. In such scenarios, a consistency level or requirement may be specified for the query. For example, in some embodiments, the query may specify whether it should be performed in serializable fashion (e.g., waiting or rejecting the query until all updates or changes to the data objects or index object proceeding the query have been completed) or in an eventual consistent fashion (e.g., where a state of the data objects and/or index object is returned that may (or may not) be the current state).

As indicated at 820, in response to receiving the query directed to the index object, the subset of data objects may be accessed according to the links of the index object in order to perform the query, in various embodiments. For example, references, pointers, or other values that identify the location of the linked data objects in underlying storage of the graph database (e.g., which like the directory storage service discussed above with regard to FIGS. 2-7 may be a different type of data store, such as relational or non-relational (e.g., NoSQL) database). A query engine (or other graph database component) may "traverse" the links by accessing the referenced objects in the index object. Query predicate(s) may be applied to evaluate the values of the attribute(s) indicated by the predicates. In some embodiments, access to other attributes, attributes, features, or values stored and/or associated with data objects that were not indexed when the index object was created may not be accessed when performing the query. For example, if the attribute value "name" was indexed, but the attribute "email" was not indexed, then a query predicate that specified or attempted to access values for "email" may be ignored (or result in an error indicating an invalid query for including the non-indexed attribute).

As indicated at 830, a result of the query may be returned to the client, in various embodiments. Results of the query may be returned according to the same interface, protocol, or format via which the query was received, in some embodiments. The results may be formatted according to parameters or values for the results included in the query when received at 910, in some embodiments. For example, a pagination scheme may be indicated for interactive result interfaces (e.g., indicating a number or batch or results to the query to be returned in a single instance (of multiple instances), such as 10 results per "page").

Figure 9:
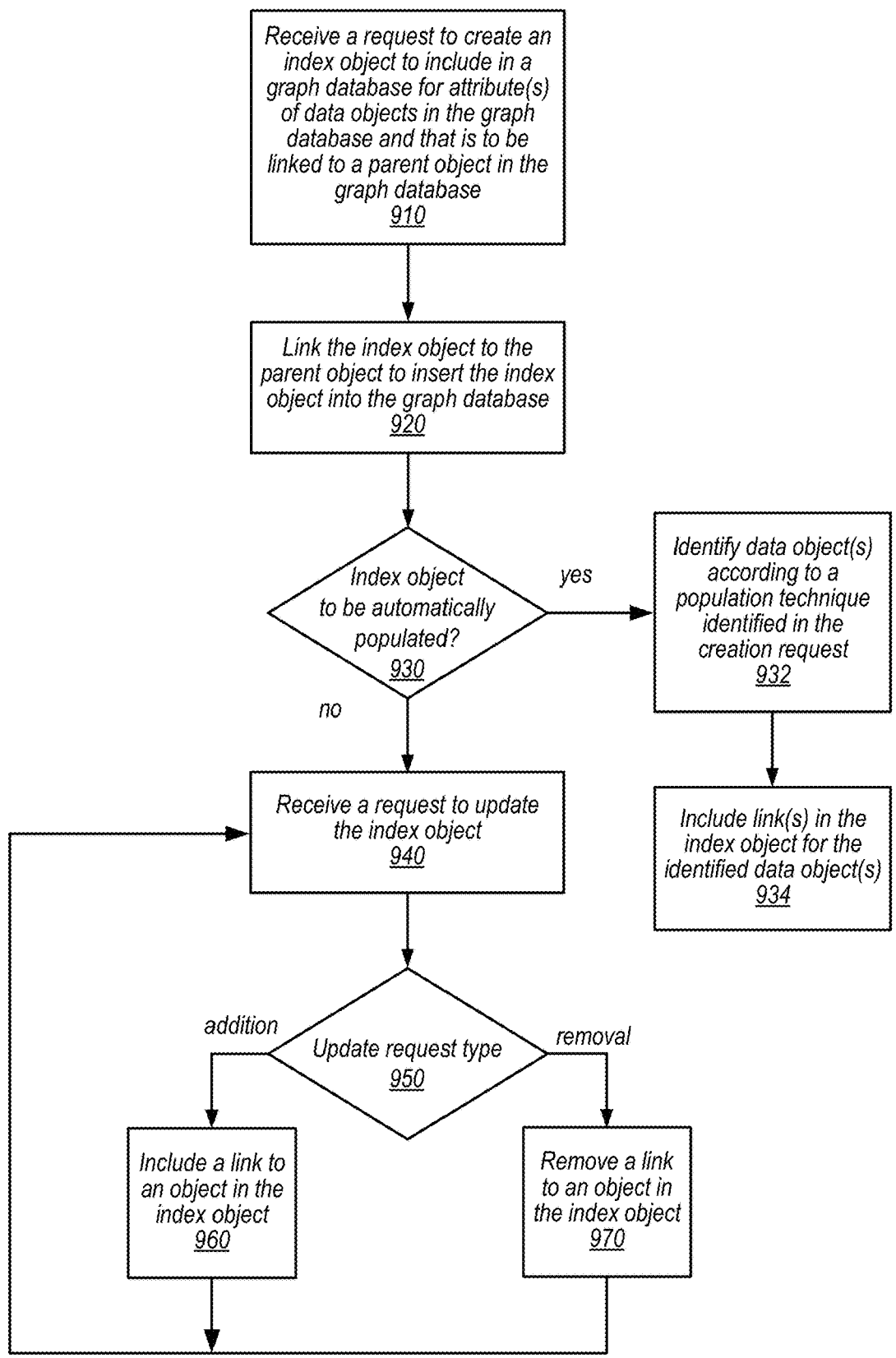
FIG. 9 is a high-level flowchart illustrating methods and techniques to create an accessible index object to be included in a graph data structure of a graph database, according to some embodiments.

FIG. 9 is a high-level flowchart illustrating methods and techniques to create an accessible index object to be included in a graph data structure of a graph database, according to some embodiments. As indicated at 910, a request to create an index object to include in a graph database for attribute(s) of data objects in the graph database may be received, in various embodiments. The attribute(s) may be specified according to an attribute name or identifier. For example, the creation request may specify that the index object is to index the "position" attribute in data objects linked to the index object. In some embodiments, the request may specify whether indexed attributes are to be unique for the index (e.g., only allowing a single data object to be linked to the index object with an attribute value, such as only allowing one data object with the "username" attribute value of "userA" to be attached or otherwise linked to the index object.

The request may also identify or indicate an object in the graph database to which the index object is to be linked as a parent object for the index object, in some embodiments. For example, the identifier of the data object to serve as parent may be included. By allowing the creation request to specify the parent object, the subset of data objects which may be linked (either manually or automatically as discussed below) may be defined, in some embodiments, according to the relationship between the parent object and other objects, as discussed above with regard to FIGS. 1 and 5.

The index object may be created in response to the request, in various embodiments. For example, data records, fields, or other structures or values may be created, initialized, populated, and/or otherwise prepared in an underlying storage system for the graph database (e.g., in a NoSQL table as a new item in the table). Information describing the features of the index object, such as the attributes to be indexed, whether uniqueness is enforced, or other index features, controls, or schemas may be described as part of creating the index object. For example, an access control list or other security mechanism may be updated to indicate which users are authorized to access the index object via a query. As indicated at 920, the index object may be linked to the parent object to insert the index object into the graph database, in various embodiments. Thus, the index object may become accessible to a query engine or other graph database component (e.g., storage engine 340 in FIG. 3) by traversing the links indicated in the graph data structure that includes index object link to the parent object. In this way, the index object may now provide an alternative access path to those data objects linked to the index object in the graph database.

As indicated at 930, a determination may be made whether the index object is automatically populated, in some embodiments. For example, the request to create the query may specify whether the index object is automatically populated (or not) according to a parameter, flag, or other population technique identified in the request. For example, in some embodiments, one population technique may be evaluated according to a schema, such as the schemas for directories discussed above with regard to FIGS. 2-4, as it is applied to data objects in order to select or identify which data objects should populate an index object (such as selecting those objects with one or more classes or other features of a schema applied). In some embodiments, different types of links (e.g., links attaching a certain type of object, policy, attribute, etc.) may be used as the criteria to determine whether an object should be selected. Population techniques may identify immediate children of a data object, all descendants of a parent object, or path(s) of objects specified in the creation request. For those index objects that are automatically populated, then as indicated by the positive exit from 930, data object(s) may be identified according to a population technique (or combination of population techniques) identified in the creation request, as indicated at 932. For example, a search traversal technique (e.g., depth-first search or breadth-first search among other search techniques) according to the links or references between those data objects included in the portion of the graph data structure (e.g., a directory structure) that are children of the parent object, in some embodiments, to identify those data objects that include the attribute(s) to be indexed. As indicated at 934, link(s) to the identified data object(s) may be included in the index object, in various embodiments. For example, references, pointers, or other locators for the underlying storage location for the identified data objects may be stored as part of the index object (e.g., in the index object's underlying storage location).

For those index objects not to be automatically populated, the index object may be updated according to requests (e.g., received from a user as discussed above according to FIG. 7). The index object may remain empty of links until a request to update the index object is received, as indicated at 940, in some embodiments. Different update request types may be received, in some embodiments. For example, an addition request may be received indicating a data object to add to the index object. In some embodiments, constraints, or other index design controls or features, such as uniqueness, may be evaluated before allowing the addition to be performed (e.g., checking to see whether the data object is a child of the parent object or checking to see whether the attribute value of the data object is indexed by the index object). As indicated at 960, a link to the object may be included in the index object, in various embodiments. For instance, references, pointers, or other locators for the underlying storage location for the data object to add to the index object may be stored as part of the index object (e.g., in the index object's underlying storage location).

Another type of index object update request that may be received is a removal request. For example, an update request may be received to remove an object from the index. As indicated at 970, a link to an object identified in the removal request may be removed from the index object, in some embodiments. For instance, references, pointers, or other locators for the underlying storage location for the data object to add to the index object may be deleted or marked for deletion (or to be ignored when performing queries that use the index object) as part of the index object (e.g., in the index object's underlying storage location).

The methods described herein may in various embodiments be implemented by any combination of hardware and software. For example, in one embodiment, the methods may be implemented by a computer system (e.g., a computer system as in FIG. 10) that includes one or more processors executing program instructions stored on a computer-readable storage medium coupled to the processors. The program instructions may implement the functionality described herein (e.g., the functionality of various servers and other components that implement the directory storage service and/or storage services/systems described herein). The various methods as illustrated in the figures and described herein represent example embodiments of methods. The order of any method may be changed, and various elements may be added, reordered, combined, omitted, modified, etc.

Figure 10:
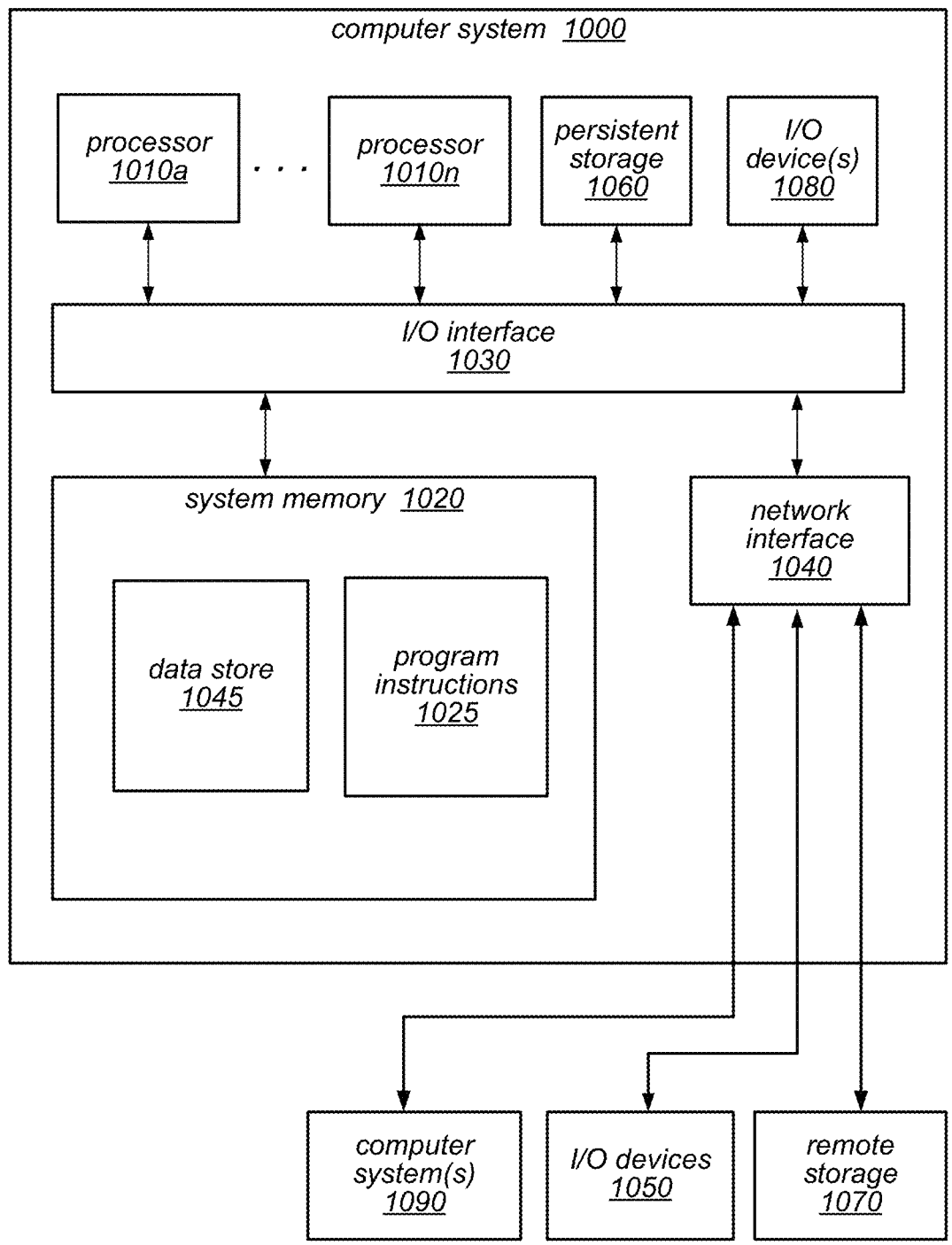
FIG. 10 is an example computer system, according to various embodiments.

FIG. 10 is a block diagram illustrating a computer system that can implement accessible index objects for graph data structures, according to various embodiments, as well as various other systems, components, services or devices described above. For example, computer system 1000 may implement storage nodes that maintain graph data structures that include index objects that can be accessed to perform queries with respect to the graph data structure, in different embodiments. Computer system 1000 may be any of various types of devices, including, but not limited to, a personal computer system, desktop computer, laptop or notebook computer, mainframe computer system, handheld computer, workstation, network computer, a consumer device, application server, storage device, telephone, mobile telephone, or in general any type of computing device.

Computer system 1000 includes one or more processors 1010 (any of which may include multiple cores, which may be single or multi-threaded) coupled to a system memory 1020 via an input/output (I/O) interface 1030. Computer system 1000 further includes a network interface 1040 coupled to I/O interface 1030. In various embodiments, computer system 1000 may be a uniprocessor system including one processor 1010, or a multiprocessor system including several processors 1010 (e.g., two, four, eight, or another suitable number). Processors 1010 may be any suitable processors capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA. The computer system 1000 also includes one or more network communication devices (e.g., network interface 1040) for communicating with other systems and/or components over a communications network (e.g. Internet, LAN, etc.). For example, a client application executing on system 1000 may use network interface 1040 to communicate with a server application executing on a single server or on a cluster of servers that implement one or more of the components of the directory storage systems described herein. In another example, an instance of a server application executing on computer system 1000 may use network interface 1040 to communicate with other instances of the server application (or another server application) that may be implemented on other computer systems (e.g., computer systems 1090).

In the illustrated embodiment, computer system 1000 also includes one or more persistent storage devices 1060 and/or one or more I/O devices 1080. In various embodiments, persistent storage devices 1060 may correspond to disk drives, tape drives, solid state memory, other mass storage devices, or any other persistent storage device. Computer system 1000 (or a distributed application or operating system operating thereon) may store instructions and/or data in persistent storage devices 1060, as desired, and may retrieve the stored instruction and/or data as needed. For example, in some embodiments, computer system 1000 may host a storage system server node, and persistent storage 1060 may include the SSDs attached to that server node.

Computer system 1000 includes one or more system memories 1020 that can store instructions and data accessible by processor(s) 1010. In various embodiments, system memories 1020 may be implemented using any suitable memory technology, (e.g., one or more of cache, static random access memory (SRAM), DRAM, RDRAM, EDO RAM, DDR 20 RAM, synchronous dynamic RAM (SDRAM), Rambus RAM, EEPROM, non-volatile/Flash-type memory, or any other type of memory). System memory 1020 may contain program instructions 1025 that are executable by processor(s) 1010 to implement the methods and techniques described herein. In various embodiments, program instructions 1025 may be encoded in platform native binary, any interpreted language such as Java™ byte-code, or in any other language such as C/C++, Java™, etc., or in any combination thereof. For example, in the illustrated embodiment, program instructions 1025 include program instructions executable to implement the functionality of a storage nodes that store graph data structures, in different embodiments. In some embodiments, program instructions 1025 may implement multiple separate clients, server nodes, and/or other components.

In some embodiments, program instructions 1025 may include instructions executable to implement an operating system (not shown), which may be any of various operating systems, such as UNIX, LINUX, Solaris™, MacOS™, Windows™, etc. Any or all of program instructions 1025 may be provided as a computer program product, or software, that may include a non-transitory computer-readable storage medium having stored thereon instructions, which may be used to program a computer system (or other electronic devices) to perform a process according to various embodiments. A non-transitory computer-readable storage medium may include any mechanism for storing information in a form (e.g., software, processing application) readable by a machine (e.g., a computer). Generally speaking, a non-transitory computer-accessible medium may include computer-readable storage media or memory media such as magnetic or optical media, e.g., disk or DVD/DIRECTORY STORAGE SERVICE 220-ROM coupled to computer system 1000 via I/O interface 1030. A non-transitory computer-readable storage medium may also include any volatile or non-volatile media such as RAM (e.g. SDRAM, DDR SDRAM, RDRAM, SRAM, etc.), ROM, etc., that may be included in some embodiments of computer system 1000 as system memory 1020 or another type of memory. In other embodiments, program instructions may be communicated using optical, acoustical or other form of propagated signal (e.g., carrier waves, infrared signals, digital signals, etc.) conveyed via a communication medium such as a network and/or a wireless link, such as may be implemented via network interface 1040.

In some embodiments, system memory 1020 may include data store 1045, which may be implemented as described herein. For example, the information described herein as being stored by the storage nodes described herein may be stored in data store 1045 or in another portion of system memory 1020 on one or more nodes, in persistent storage 1060, and/or on one or more remote storage devices 1070, at different times and in various embodiments. In general, system memory 1020 (e.g., data store 1045 within system memory 1020), persistent storage 1060, and/or remote storage 1070 may store data blocks, replicas of data blocks, metadata associated with data blocks and/or their state, configuration information, and/or any other information usable in implementing the methods and techniques described herein.

In one embodiment, I/O interface 1030 may coordinate I/O traffic between processor 1010, system memory 1020 and any peripheral devices in the system, including through network interface 1040 or other peripheral interfaces. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. Also, in some embodiments, some or all of the functionality of I/O interface 1030, such as an interface to system memory 1020, may be incorporated directly into processor 1010.

Network interface 1040 may allow data to be exchanged between computer system 1000 and other devices attached to a network, such as other computer systems 1090 (which may implement embodiments described herein), for example. In addition, network interface 1040 may allow communication between computer system 1000 and various I/O devices 1050 and/or remote storage 1070. Input/output devices 1050 may, in some embodiments, include one or more display terminals, keyboards, keypads, touchpads, scanning devices, voice or optical recognition devices, or any other devices suitable for entering or retrieving data by one or more computer systems 1000. Multiple input/output devices 1050 may be present in computer system 1000 or may be distributed on various nodes of a distributed system that includes computer system 1000. In some embodiments, similar input/output devices may be separate from computer system 1000 and may interact with one or more nodes of a distributed system that includes computer system 1000 through a wired or wireless connection, such as over network interface 1040. Network interface 1040 may commonly support one or more wireless networking protocols (e.g., Wi-Fi/IEEE 802.11, or another wireless networking standard). However, in various embodiments, network interface 1040 may support communication via any suitable wired or wireless general data networks, such as other types of Ethernet networks, for example. Additionally, network interface 1040 may support communication via telecommunications/telephony networks such as analog voice networks or digital fiber communications networks, via storage area networks such as Fibre Channel SANs, or via any other suitable type of network and/or protocol. In various embodiments, computer system 1000 may include more, fewer, or different components than those illustrated in FIG. 10 (e.g., displays, video cards, audio cards, peripheral devices, other network interfaces such as an ATM interface, an Ethernet interface, a Frame Relay interface, etc.)

It is noted that any of the distributed system embodiments described herein, or any of their components, may be implemented as one or more network-based services. For example, a database engine head node within the database tier of a database system may present database services and/or other types of data storage services that employ the distributed storage systems described herein to clients as network-based services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the network-based service in a manner prescribed by the description of the network-based service's interface. For example, the network-based service may define various operations that other systems may invoke, and may define a particular application programming interface (API) to which other systems may be expected to conform when requesting the various operations.

In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a network-based services request, a network-based services client may assemble a message including the request and convey the message to an addressable endpoint (e.g., a Uniform Resource Locator (URL)) corresponding to the network-based service, using an Internet-based application layer transfer protocol such as Hypertext Transfer Protocol (HTTP).

In some embodiments, network-based services may be implemented using Representational State Transfer ("RESTful") techniques rather than message-based techniques. For example, a network-based service implemented according to a RESTful technique may be invoked through parameters included within an HTTP method such as PUT, GET, or DELETE, rather than encapsulated within a SOAP message.

The various methods as illustrated in the figures and described herein represent example embodiments of methods. The methods may be implemented manually, in software, in hardware, or in a combination thereof. The order of any method may be changed, and various elements may be added, reordered, combined, omitted, modified, etc.

Although the embodiments above have been described in considerable detail, numerous variations and modifications may be made as would become apparent to those skilled in the art once the above disclosure is fully appreciated. It is intended that the following claims be interpreted to embrace all such modifications and changes and, accordingly, the above description to be regarded in an illustrative rather than a restrictive sense.

What is claimed is:

1. A system, comprising:
 a memory to store program instructions which, if performed by at least one processor, cause the at least one processor to perform a method configured to at least:
  receive, at a storage node that stores at least some of a directory structure, a request to create an index object to include in the directory structure, wherein the directory structure comprises a plurality of data objects respectively comprising one or more links to other data objects of the plurality of data objects, wherein the request identifies one of the plurality of data objects as a parent object of the index object in the directory structure, wherein to create the index object the method is configured to update data for the parent object to include a link to the index object, wherein the index object comprises a plurality of alternative links to a subset of the plurality of data objects to access the subset of the plurality of data objects via the alternative links, and wherein the index object does not provide a path for access to an additional data object of the plurality of data objects excluded from the subset of the plurality of data objects;
  receive, at the storage node subsequent to receiving the request, a query comprising a predicate and directed to the created index object, wherein individual data objects of the plurality of data objects respectively comprise an attribute value for an attribute identified by the predicate, and in response to the receipt of the query:
   identify the subset of data objects according to the alternative links of the created index object, the identified subset not including the additional data object of the plurality of data objects;
   evaluate the respective attribute values for the identified subset of data objects according to the predicate of the query applicable to the attribute of the identified subset of data objects indexed by the created index object; and
   return a result of the query based, at least in part, on the evaluation of the respective attribute values for the identified subset of data objects.

2. The system of claim 1, wherein the method is further configured to:
 prior to the receipt of the query:
  store data to create the index object in a data store for the directory structure.

3. The system of claim 1, wherein the method is further configured to:
 receive a request to add another data object of the plurality of data objects to the index object; and
 update data for the index object in a data store to include a respective link for the other data object.

4. The system of claim 1, wherein the at least one processor is implemented as part of a storage node for a network-based directory storage service and wherein the query is received according a request invoking an Application Programming Interface (API) that includes as an identifier for the index object and the predicate as part of the request.

5. A method, comprising:
receiving a request to create an index object to include in a graph database from a client of the graph database, the graph database comprising a plurality of data objects respectively comprising one or more links to other data objects of the plurality of data objects, wherein the request identifies one of the plurality of data objects as a parent object of the index object in the graph database, wherein creating the index object comprises updating data for the parent object to include a link to the index object, wherein the index object comprises a plurality of respective links to a subset of the plurality of data objects to access the subset of the plurality of data objects via the respective links, and wherein the index object does not provide a path for access to an additional data object of the plurality of data objects excluded from the subset of the plurality of data objects;
receiving, subsequent to receiving the request, a query comprising a predicate and directed to the created index object, wherein individual data objects of the plurality of data objects respectively comprise an attribute value for an attribute identified by the predicate, and in response to receiving the query:
accessing the subset of data objects according to the respective links of the index object to perform the query, the accessed subset not including the additional data object of the plurality of data objects; and
returning a result of the query to the client.

6. The method of claim 5, further comprising:
prior to receiving the query:
storing data to create the index object in a data store for the graph data structure.

7. The method of claim 6, further comprising:
wherein the request to create the index object further identifies a population technique for identifying the subset of data objects;
identifying one or more of the subset of data objects according to the population technique; and
updating the data for the index object in the data store to include the respective links to the one or more data objects of the subset of data objects.

8. The method of claim 6, further comprising:
after receiving the query:
receiving a request to delete the index object; and
updating the data for the index object in the data store to prevent further access to the index object.

9. The method of claim 5, further comprising:
prior to receiving the query:
receiving a request to add one of the subset of data objects to the index object; and
updating data for the index object in a data store to include the respective link for the one data object.

10. The method of claim 9, wherein the index object provides an index for the attribute of the subset of data objects, and wherein in response to receiving the request to add the one data object to the index object, an evaluation of a value of the attribute for the one data object is performed to determine that it is unique when compared with respective attribute values of other data objects already linked to the index object.

11. The method of claim 5, further comprising:
receiving a request to remove one of the subset of data objects from the index object; and
updating data for the index object in a data store to remove the respective link for the one data object.

12. The method of claim 5,
wherein the index object and the data objects are stored as part of a same directory structure;
wherein accessing the subset of data objects according to the respective links of the index object to perform the query, comprises evaluating the respective attribute values of the subset of data objects indexed by the index object according to a predicate of the query applicable to the attribute of the subset of the data objects; and
wherein the attribute of the data object is defined for the directory structure according to a schema for the directory structure.

13. A non-transitory, computer-readable storage medium, storing program instructions that when executed by one or more computing devices cause the one or more computing devices to implement:
receiving a request to create an index object to include in a graph data structure from a client of a graph database that stores the graph data structure, the graph data structure comprising a plurality of data objects and links between the data objects, wherein the request to create the index object identifies one of the plurality of data objects as a parent object of the index object in the graph data structure, wherein creating the index object comprises updating data for the parent object to include a link to the index object, wherein the index object comprises a plurality of respective links, different from the links between the data objects, to a subset of the plurality of data objects to access the subset of the plurality of data objects via the respective links, and wherein the index object does not provide a path for access to an additional data object of the plurality of data objects excluded from the subset of the plurality of data objects;
receiving, subsequent to receiving the request, a query comprising a predicate and directed to the created index object, wherein individual data objects of the plurality of data objects respectively comprise an attribute value for an attribute identified by the predicate, and in response to receiving the query:
identifying the subset of data objects according to the respective links of the index object, the identified subset not including the additional data object of the plurality of data objects;
evaluating the respective attribute values for the identified subset of data objects according to the predicate of the query applicable to the attribute of the data objects indexed by the index object; and
returning a result of the query based, at least in part, on the evaluation of the respective attribute values for the identified subset of data objects.

14. The non-transitory, computer-readable storage medium of claim 13, wherein the program instructions cause the one or more computing devices to further implement:
prior to receiving the query:
storing data to create the index object in a data store for the graph data structure.

15. The non-transitory, computer-readable storage medium of claim 14, wherein the program instructions cause the one or more computing devices to further implement:

receiving a request to add another one of the plurality of data objects in the graph data structure to the index object;

updating the data for the index object in a data store to include a respective link for the other data object; and wherein another query received from the client of the graph database comprising a reference to the index object includes, as part of the evaluation of the respective attribute values to perform the other query, a respective attribute value for the other data object.

16. The non-transitory, computer-readable storage medium of claim 14, wherein the program instructions cause the one or more computing devices to further implement:

receiving a request to remove one of the subset of data objects in the graph data structure from the index object;

updating the data for the index object in a data store to remove the respective link for the one data object; and wherein another query received from the client of the graph database comprising a reference to the index object does not include, as part of the evaluation of the respective attribute values to perform the other query, the respective attribute value for the one data object.

17. The non-transitory, computer-readable storage medium of claim 14, wherein the program instructions cause the one or more computing devices to further implement:

after receiving the query:

receiving a request to delete the index object; and updating the data for the index object in the data store to prevent further access to the index object.

18. The non-transitory, computer-readable storage medium of claim 13, wherein the program instructions cause the one or more computing devices to further implement:

prior to receiving the query:

receiving a request to link a data object to the index object that is not linked to other data objects in the graph data structure; and updating data for the index object in a data store to include a link to the data object;

wherein the result returned in response to the query is further based on one or more attribute values of the data object.

19. The non-transitory, computer-readable storage medium of claim 13, wherein the query is received from the client formatted as query statement in a query language.

* * * * *